United States Patent [19]
Amano et al.

[11] Patent Number: 6,155,240
[45] Date of Patent: Dec. 5, 2000

[54] ACTUATOR CONTROL APPARATUS FOR INTERNAL COMBUSTION ENGINE

[75] Inventors: Naoki Amano; Hideyuki Takaki, both of Toyota, Japan

[73] Assignee: Toyota Jidosha Kabushiki Kaisha, Toyota, Japan

[21] Appl. No.: 09/268,791

[22] Filed: Mar. 16, 1999

[30] Foreign Application Priority Data

Jun. 26, 1998 [JP] Japan .................................. 10-181049

[51] Int. Cl.⁷ .................................................. F02B 47/08
[52] U.S. Cl. .............................. 123/568.28; 123/568.22
[58] Field of Search .................. 123/568.22, 568.28; 701/108

[56] References Cited

U.S. PATENT DOCUMENTS

| | | | |
|---|---|---|---|
| 4,462,377 | 7/1984 | Tanaka et al. | 123/568.22 |
| 4,466,416 | 8/1984 | Kawamura | 123/568.22 |
| 4,562,821 | 1/1986 | Ikeda | 123/569 |
| 4,625,702 | 12/1986 | Onishi | 123/568.22 |

FOREIGN PATENT DOCUMENTS 1-295666 11/1988 Japan .
2-267357 11/1990 Japan .

*Primary Examiner*—Noah P. Kamen
*Assistant Examiner*—Mahmoud M. Gimie
*Attorney, Agent, or Firm*—Kenyon & Kenyon

[57] ABSTRACT

A lower limit EIEOF of a current for controlling the EGR valve employed to prevent the EGR valve from generating chattering is set in accordance with an engine revolution speed NE which indirectly indicates an amount of exhaust pressure acting on the EGR valve as the current value of the lower limit EIEOF is influenced by the exhaust pressure as a back pressure of the EGR valve. Therefore, it is possible to set a current value eiefin for EGR control in a range which has not been conventionally covered. The EGR control can be applied to a wider driving region, thus achieving an improved driving state of a diesel engine.

15 Claims, 7 Drawing Sheets

ACTUATOR CONTROL APPARATUS FOR INTERNAL COMBUSTION ENGINE

BACKGROUND OF THE INVENTION

The disclosure of Japanese Patent Application No. HEI 10-181049 filed on Jun. 26, 1998 including the specification, drawings and abstract is incorporated herein by reference in its entirety.

BACKGROUND OF THE INVENTION

1. Field of the Invention

The present invention relates to an actuator control apparatus for an internal combustion engine such as an exhaust gas recirculation control apparatus.

2. Description of the Related Art

In an exhaust gas recirculation control apparatus used in an internal combustion engine, an EGR valve is provided in an exhaust gas recirculation passage for appropriately adjusting the EGR (exhaust gas recirculation) ratio in accordance with a driving state of the internal combustion engine (Japanese Patent Applications Laid-open No. HEI 1-295666 and No. HEI 2-267357). The opening degree of this EGR valve is controlled by the adjusted vacuum pressure supplied from an electronic vacuum regulating valve. In this case, the opening degree of the EGR valve is determined by a balance of vacuum pressure from the electronic vacuum regulating valve and back pressure in the exhaust gas recirculation passage.

However, if the opening degree of the EGR valve is too small, chattering is generated in the EGR valve due to variations in the back pressure, and noise and variation in the EGR ratio may result.

In order to prevent this, as shown in FIG. 9, when the opening degree of the EGR valve is adjusted in accordance with the driving state of the internal combustion engine, an electric current value capable of achieving an opening degree at which no chattering is generated in the EGR valve in entire driving region of the internal combustion engine is preliminarily set as a current value of the lower limit MIN such that only currents greater than this current value of the lower limit MIN are supplied to the EGR valve, and, when a current value lower than the current value of the lower limit MIN is required, the current is set to "0", and no current is supplied.

If the current value of the lower limit MIN at which no chattering is generated in the entire driving region of the internal combustion engine is set, and the opening degree of the EGR valve is uniformly controlled in this manner, it is possible to reduce the chattering of the EGR valve. However, according to this control a driving region exists in which, even when the opening degree of the EGR valve is controlled by a current value smaller than the current value of the lower limit MIN, the opening degree can be controlled without generating chattering in the EGR valve.

In this manner, even in a driving region in which the current value can be reduced to a value smaller than the current value of the lower limit MIN, current values smaller than the current value of the lower limit MIN cannot be obtained. Therefore, although it is preferable for fuel efficiency, emission control and the like to conduct EGR, EGR execution may not occur.

SUMMARY OF THE INVENTION

It is an object of the present invention to achieve an improved driving state of an internal combustion engine by applying an actuator control such as an EGR control to a wider driving range (region) through adjustment of a limit value of a command signal for controlling the EGR valve in accordance with a driving state.

An actuator control apparatus for an internal combustion engine according to a first aspect of the present invention includes an actuator operated by a balance of a control pressure and a back pressure that varies with a driving state of the internal combustion engine, a control pressure supply valve for controlling a pressure generated by a pump to be supplied to the actuator in accordance with a command signal having a limit value, and limit value setting means for setting a limit value of the command signal in accordance with a driving state of the internal combustion engine.

The limit value above which the actuator does not generate chattering in the command signal is affected by the driving state of the internal combustion engine. The limit value setting means sets the limit value of the command signal in accordance with the driving state of the internal combustion engine.

Therefore, the limit value cannot be constant over an entire driving range of the internal combustion engine, and the actuator can be controlled at the control pressure applied from the control pressure supply valve until an instant immediately before chattering is to be generated. Therefore, the actuator can be controlled in a wider driving range and an improved driving state of the internal combustion engine can be achieved. Further, since data indicating the driving state of the internal combustion engine have been detected for control of other functions of the internal combustion engine, no special apparatus is required, and manufacturing costs are not substantially increased.

In the first aspect of the invention, the limit value setting means sets a limit value of the command signal in accordance with the back pressure.

The limit value provided such that the actuator generates no chattering in the command signal is affected by the back pressure of the actuator. Since the back pressure varies depending on the driving state of the internal combustion engine, the limit value setting means directly or indirectly grasps the variation in this back pressure, and sets the limit value of the command signal in accordance with the back pressure.

Further, in the first aspect, the limit value setting means uses a revolution number (revolution speed) of the internal combustion engine as a driving state thereof, and sets a limit value of the command signal in accordance with the revolution speed of the internal combustion engine.

By using the revolution speed of the internal combustion engine as the driving state of the internal combustion engine in this manner, it is possible to appropriately set the limit value of the command signal in accordance with the variation in the back pressure.

According to a second aspect of the present invention, in the actuator control apparatus for the internal combustion engine of first aspect, the actuator is formed as an EGR valve for controlling an opening degree of an exhaust gas recirculation passage, the control pressure supply valve is formed as an electric pressure regulating valve for controlling a pressure from a vacuum pump to be supplied to the EGR valve, and the command signal having a limit value is formed as a current for driving the electric pressure regulating valve having a current value of the lower limit.

With this structure, the EGR control can be applied to a wider driving range and an improved driving state of the internal combustion engine can be achieved.

Further, in the second aspect, a revolution speed sensor, an exhaust gas pressure sensor, an intake gas pressure sensor, an air-flow meter, a fuel injection means and the like may be provided as means for detecting the driving state of the internal combustion engine.

A function for realizing the various kinds of means of the actuator control apparatus for the internal combustion engine can be provided as a program which runs on the computer system. In the case of such a program, the program can be stored in a storing medium such as a ROM or a backup RAM that can be read by the computer, and the ROM or the backup RAM is incorporated in the computer system and used. Alternatively, the program may be stored in a storing medium such as a floppy disk, a magneto-optical disk, a CD-ROM and a hard disk that can be read by the computer, and the program may be loaded into computer system, if necessary, for starting.

DETAILED DESCRIPTION OF THE PREFERRED EMBODIMENTS

First Embodiment

Figure 1:
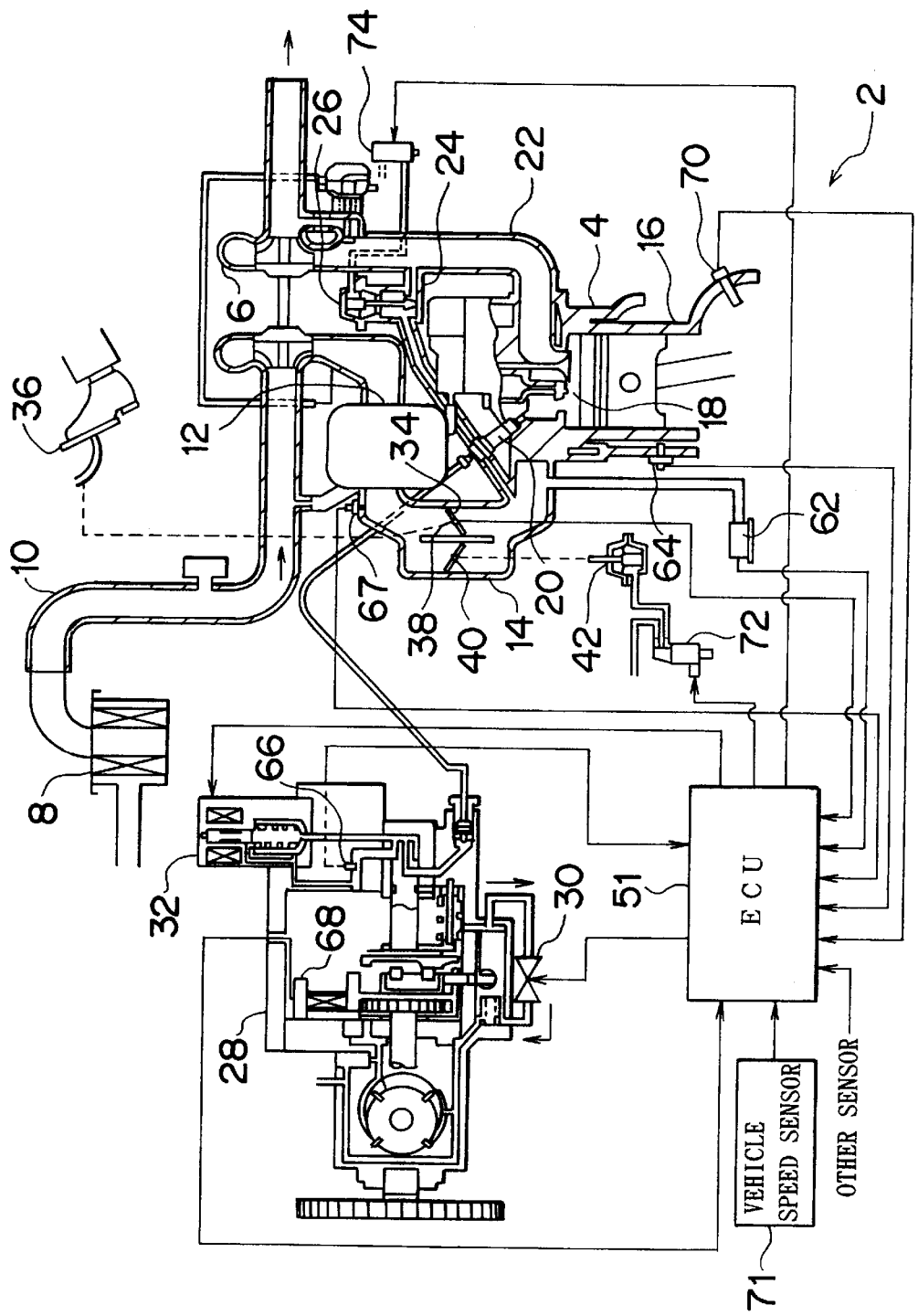
FIG. 1 is a block diagram showing a structure of a diesel engine control apparatus of a first embodiment.

FIG. 1 is a block diagram schematically showing a structure of a diesel engine control apparatus 2 to which the present invention is applied.

A diesel engine 4 for driving a vehicle is mounted therein. The diesel engine 4 includes a turbocharger 6 for supercharging air introduced into an intake gas pipe 10 through an air cleaner 8 so as to be introduced into a combustion chamber 18 in a cylinder 16 through an intercooler 12 and a venturi 14.

Fuel is injected into the combustion chamber 18 through a fuel injection valve 20, and exhaust gas after combustion is discharged into an exhaust pipe 22 and further outside by the turbocharger 6 that has been driven.

An exhaust gas recirculation pipe 24 is provided between the exhaust pipe 22 upstream from the turbocharger 6 and the intake pipe 10 downstream from the venturi 14. The exhaust gas recirculation pipe 24 is provided with an EGR valve 26, opening and closing operation of which is adjusted by a command of an ECU 51 (to be described later) through an electric vacuum pressure regulating valve (EVRV). When the EGR valve 26 is opened, the exhaust gas recirculation pipe 24 supplies the exhaust gas from the exhaust pipe 22 to the intake pipe 10 for executing exhaust gas recirculation.

Figure 2:
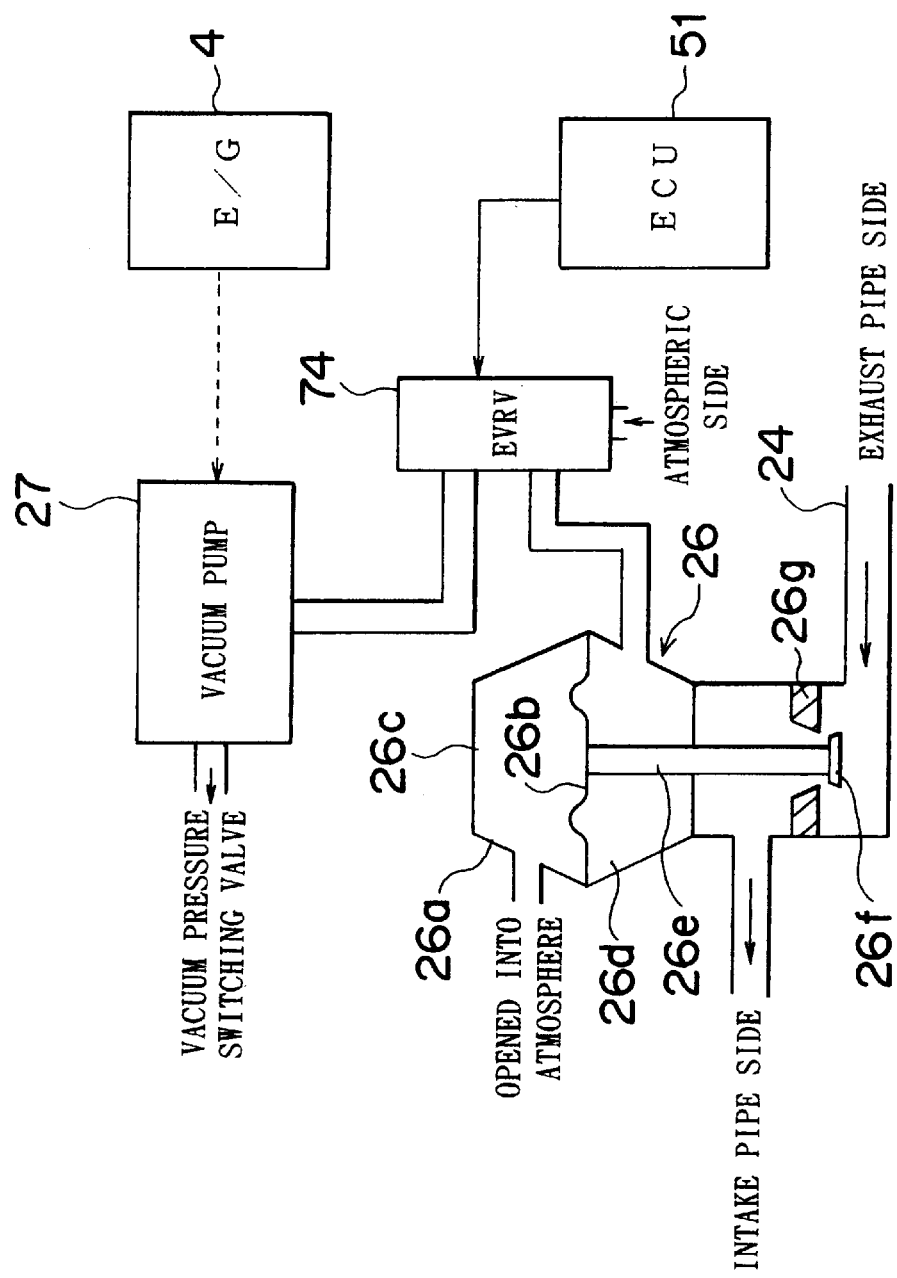
FIG. 2 is a block diagram of periphery of an EGR valve of the first embodiment.

FIG. 2 shows the EGR valve 26 and a driving mechanism thereof. The EGR valve 26 is formed as a so-called externally open type EGR valve, and includes a diaphragm mechanism. The inside of a body case 26a of the EGR valve 26 is separated by a diaphragm 26b into a first diaphragm chamber 26c opened to atmosphere, and a second diaphragm chamber 26d connected to a vacuum pump 27 driven by the diesel engine 41 and atmospheric side.

A rod 26e is attached to one surface of the diaphragm 26b at the side of the second diaphragm chamber 26d, projecting therefrom toward a seat portion 26g disposed in the exhaust gas recirculation pipe 24. The rod 26e is provided at its tip end with a valve 26f for adjusting an exhaust gas flow in cooperation with the seat portion 26g.

The EVRV 74 generates a vacuum pressure adjusted in accordance with driving current of the ECU 51 with the aid of a vacuum pressure supplied from the vacuum pump 27 and atmospheric pressure supplied from atmosphere. The thus generated vacuum pressure is supplied to the second diaphragm chamber 26d of the EGR valve 26 as a control pressure. Therefore, a position of the diaphragm 26b is determined by atmospheric pressure at the side of the first diaphragm chamber 26c, back pressure (exhaust pressure in the exhaust gas recirculation pipe 24) acting on the tip end of the valve 26f, and the control pressure at the side of the second diaphragm chamber 26d. The position of the diaphragm 26b determines a position of the rod 26e attached to the one surface of the diaphragm 26b, and also determines a relative positional relation (corresponding to the opening degree of the EGR valve 26) between the valve 26f and the seat portion 26g. Accordingly it is obvious that the opening degree of the EGR valve 26 is determined by a balance of the control pressure from the EVRV 74 and the exhaust pressure in the exhaust gas recirculation pipe 24.

Referring back to FIG. 1, a high pressure fuel is supplied from a distribution type fuel injection pump 28 to the fuel injection valve 20 while adjusting the fuel injection timing and the fuel injection amount. The distribution type fuel injection pump 28 is provided with a timing control valve 30 which is driven by the ECU 51 to adjust the fuel injection timing. Further, the distribution type fuel injection pump 28 is provided with an electromagnetic spill valve 32 which is driven by the ECU 51 to adjust the fuel injection amount.

A first throttle valve 34 in the venturi 14 is opened and closed in association with an accelerator pedal 36. A rotating shaft of the first throttle valve 34 is provided with an accelerator sensor 38 which detects an accelerator opening degree ACCP, i.e., an operation amount of the accelerator pedal 36. A second throttle valve 40 is provided in the venturi 14 in parallel with the first throttle valve 34, and is adjusted by the ECU 51 through a diaphragm mechanism 42 and a vacuum pressure switching valve 72.

Figure 3:
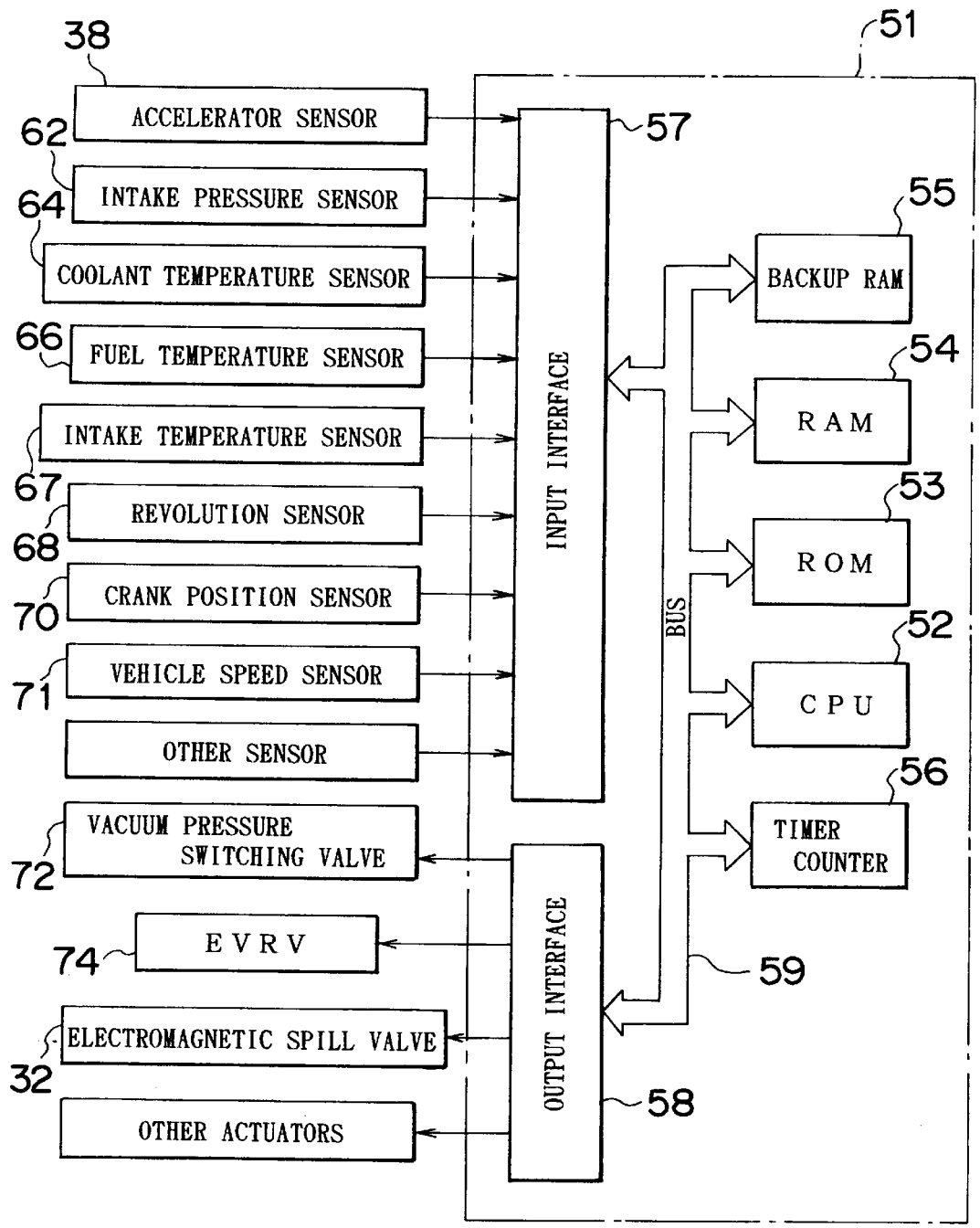
FIG. 3 is a block diagram showing an electrical structure of an ECU used in the first embodiment.

An electrical structure of the ECU 51 will be explained referring to a block diagram of FIG. 3.

The ECU 51 is formed of a central processing unit (CPU) 52, a read-only memory (ROM) 53 in which a predetermined program or a map is preliminarily stored, a random-access memory (RAM) 54 in which a calculation result of the CPU 52 is temporarily stored, a backup RAM 55 in which the preliminarily stored data or the like are retained, a timer counter 56 as well as an input interface 57 and an output interface 58. Further, the aforementioned components 52 to 56 are connected to the input interface 57 and the output interface 58 through a bus 59.

The accelerator sensor 38, the intake pressure sensor 62 for detecting a pressure of the intake air downstream from the venturi 14, a coolant temperature sensor 64 for detecting an engine coolant temperature THW of the diesel engine 4, a fuel temperature sensor 66 for detecting a temperature of a fuel in the distribution type fuel injection pump 28, an intake temperature sensor 67 mounted in the intake pipe 10 for detecting an intake temperature, and other sensors are connected to the input interface 57 through a buffer, a multiplexer, an A/D converter (none of them are shown)

Further, a revolution sensor 68 for detecting the revolution speed NE of the diesel engine 4 based on rotation of the distribution type fuel injection pump 28, a crank position sensor 70 for detecting a reference angle position of a crankshaft of the diesel engine 4, vehicle speed sensor 71, and other sensors are connected to the input interface 57 through a waveform shaping circuit (not shown). A starter switch and the like (not shown) are also directly connected to the input interface 57. The aforementioned mechanism may allow the CPU 52 to read signals from the aforementioned respective sensors.

Connected to the output interface 58 through the respective driving circuits (not shown) are the aforementioned electromagnetic spill valve 32, the vacuum pressure switching valve 72 for adjusting the opening degree of the second throttle valve 40 by adjusting the operation of the diaphragm mechanism 42 in a state where vacuum pressure generated by the vacuum pump 27 and the atmospheric pressure are supplied, and the EVRV 74 for adjusting the exhaust gas recirculation amount of the exhaust gas recirculation pipe 24 by adjusting the opening degree of the EGR valve 26 in a state where the atmospheric pressure and the vacuum pressure generated by the vacuum pump 27 are supplied.

Therefore, the CPU 52 appropriately adjusts the electromagnetic spill valve 32, the vacuum pressure switching valve 72, the EVEV 74 and the like through the output interface 58 based on the detected values of the sensors which have been read through the input interface 57, and appropriately controls the driving state of the diesel engine 4.

Figure 4:
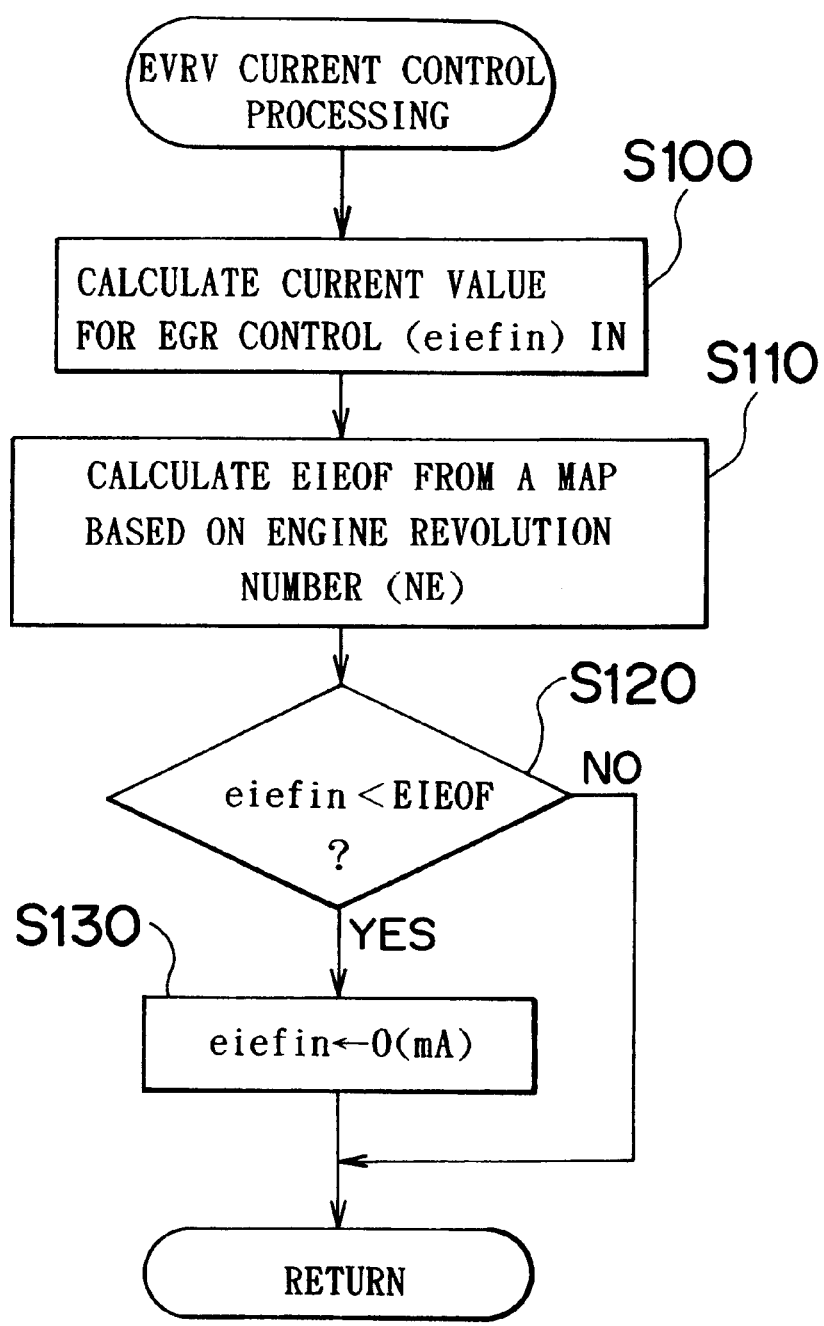
FIG. 4 is a flowchart showing EVRV current control processing executed by the ECU in the first embodiment.
Figure 5:
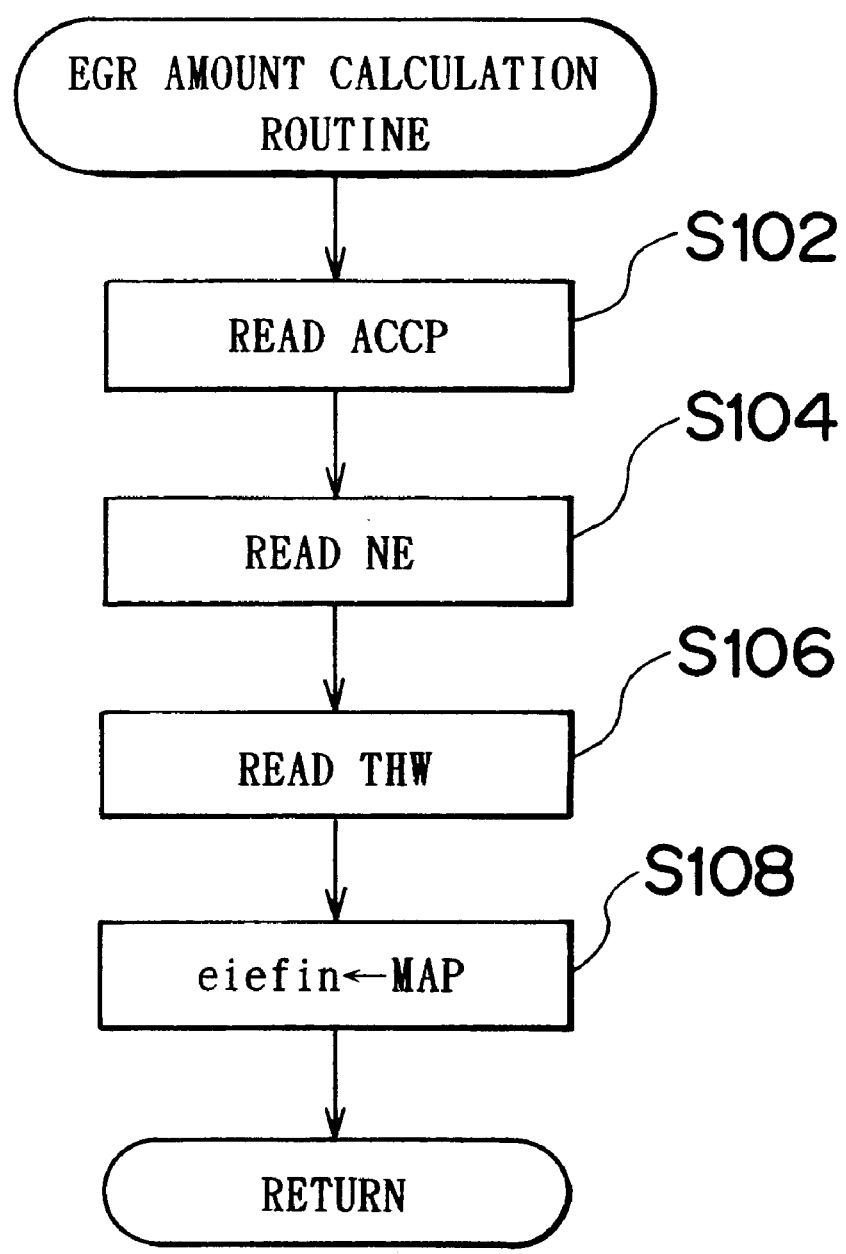
FIG. 5 is a flowchart showing an EGR amount calculating routine executed by the ECU in the first embodiment.

Next, among controls executed by the ECU 51 in the present embodiment, EVRV current control processing as EGR amount control will be explained. FIGS. 4 and 5 show flowcharts. This processing routine is executed through interruption at every 180° crank angle (every explosion stroke). Steps in flowcharts corresponding to the individual processing will be represented by prefixing "S" to the respective step numbers.

Upon start of the EVRV current control processing in FIG. 4, first, a current value eiefin for EGR control corresponding to the EGR amount in accordance with a driving state of the control apparatus 2 for the diesel engine is calculated by a routine for calculating the EGR amount (S100).

In the aforementioned EGR amount calculating routine shown in FIG. 5, the value of the accelerator opening degree ACCP detected by the accelerator sensor 38 is read (S102). A value of the engine revolution speed NE detected by the revolution sensor 68 is read (S104). The engine coolant temperature THW detected by the coolant temperature sensor 64 is read (S106).

Based on the detected values ACCP, NE and THW, the current value eiefin for EGR control corresponding to the EGR amount is derived (S108) from a map (not shown) of current values for EGR control using parameters such as the accelerator opening degree, the engine revolution and the engine coolant temperature.

Referring back to FIG. 4, upon calculation of the current value eiefin for EGR control, the current value of the lower limit EIEOF is calculated (S100) from a current value of the lower limit map (unidimensional map) using the engine revolution speed as a parameter based on the engine revolution speed NE which has been read in step S104.

Figure 6:
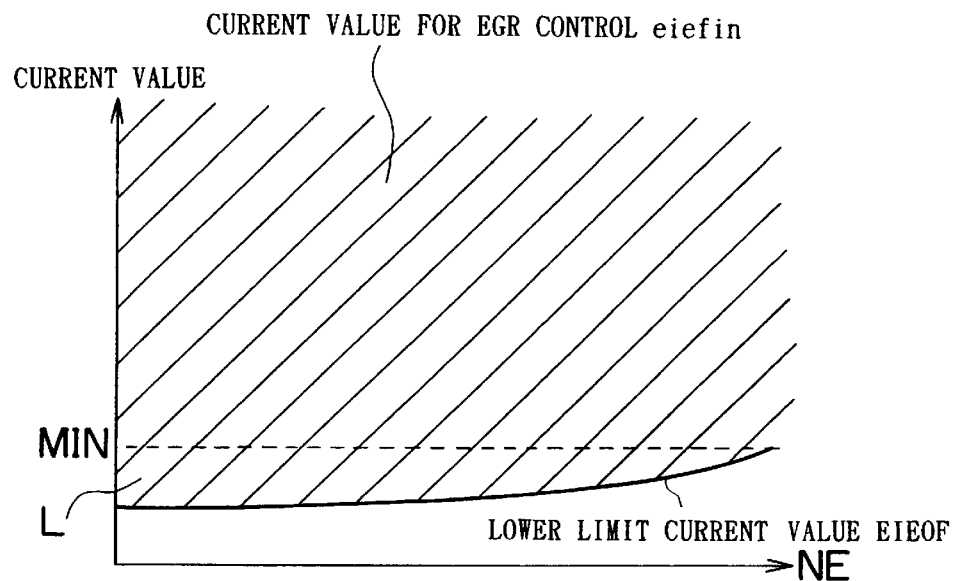
FIG. 6 is an explanatory view of a current value of the lower limit map used in the first embodiment.
Figure 9:
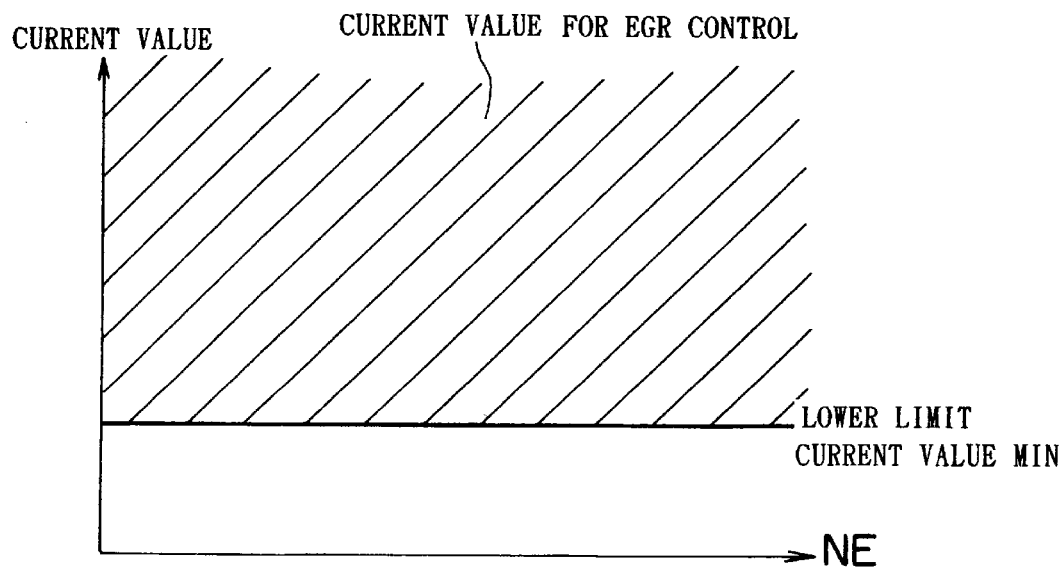
FIG. 9 is an explanatory view for setting a current value of the lower limit.

A graph of FIG. 6 represents an example of the current value of the lower limit map. Here, the current value of the lower limit EIEOF is set to be increased as the engine revolution speed NE is reduced. More specifically, it is possible to set the current value of the lower limit EIEOF to the value lower than the stationary current value of the lower limit MIN as shown in FIG. 9 (shown by a dashed line in FIG. 6) in the range where no chattering is generated in the EGR valve 26. That is, it is possible to control the opening degree of the EGR valve 26 up to a sufficiently small opening degree even in a region where the engine revolution speed NE is small.

Next, it is judged whether or not the current value eiefin for EGR control calculated in step S100 is smaller than the current value of the lower limit EIEOF calculated in step S110 (S120). If eiefin <EIEOF (YES in S120), since chattering is generated in the EGR valve 26 in case of the current value eiefin for EGR control calculated in step S100, it is set to "0" (for example, mA as the unit) to prevent the chattering. By this, the process is temporarily completed such that no current is supplied to the EVRV 74 to keep the EGR valve 26 closed.

Meanwhile, if eiefin ≧EIEOF (NO in S120), the present process is temporarily completed with the current value eiefin for EGR control calculated in step S100 kept unchanged. With this processing, the current corresponding to the current value eiefin for EGR control calculated in step S100 is supplied to the EVRV 74, and the EGR valve 26 is opened at an opening degree in accordance with the driving state of the diesel engine 4.

The aforementioned embodiment provides the following advantages.

The current value of the lower limit EIEOF that has been set with respect to the current value eiefin for EGR control such that the EGR valve 26 generates no chattering is affected by an exhaust gas pressure as a back pressure of the EGR valve 26. Since the exhaust gas pressure varies with the driving state of the diesel engine 4, this variation in the exhaust gas pressure is indirectly grasped using the engine revolution speed NE, and the current value of the lower limit EIEOF is set in accordance with the engine revolution speed NE in step S110. That is, it is possible to set the current value eiefin for EGR control to a range (a region L below the dashed line in FIG. 6) which cannot be adjusted by the conventional technique.

For this reason, the current value of the lower limit EIEOF cannot be kept constant in the entire driving region of the diesel engine 4, and it is possible to control the opening degree of the EGR valve 26 in the entire driving region by the control pressure from the EVRV 74 up to an instance just before generation of the chattering in the EGR valve 26. Therefore, it is possible to control the EGR in a wider driving region to achieve the improved driving state of the diesel engine 4.

Since the lower limit current map uses only the engine revolution speed NE as a parameter, it is only necessary to use data of the engine revolution speed NE which have been already used for various controls even if a sensor is not newly added for detecting a value of the parameter, thus suppressing increase in the manufacturing costs.

Second Embodiment

Figure 7:
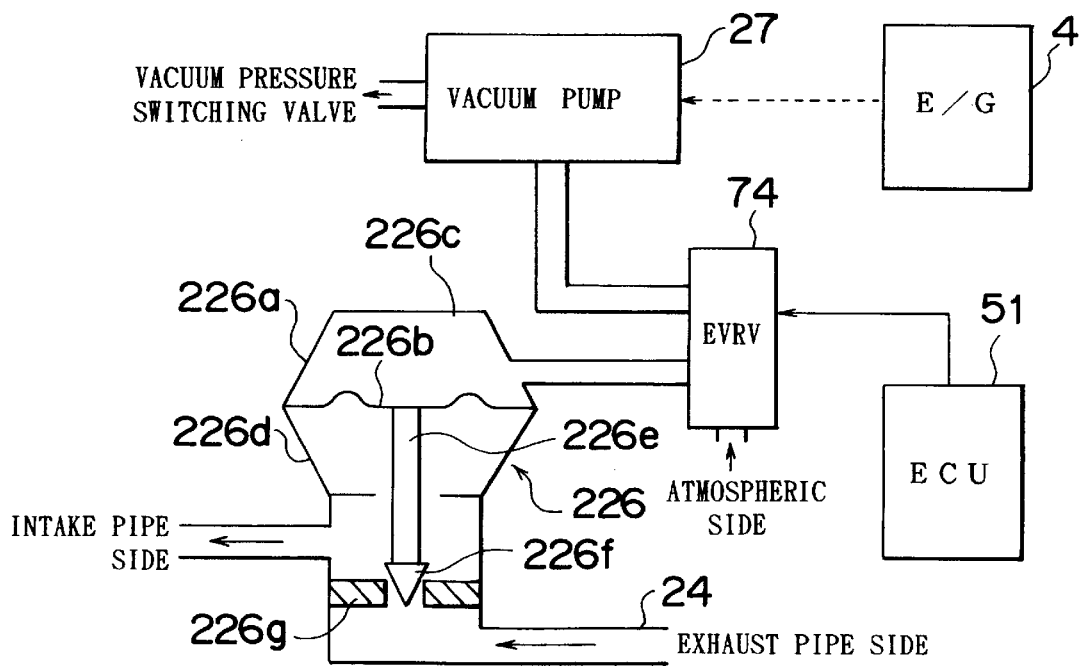
FIG. 7 is a block diagram of periphery of an EGR valve of a second embodiment.
Figure 8:
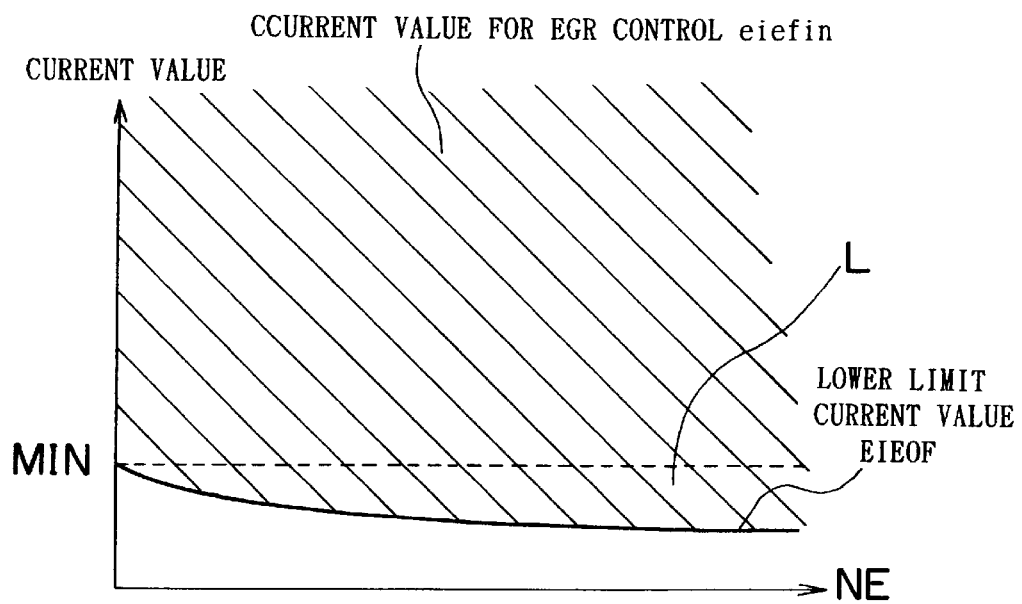
FIG. 8 is an explanatory view of a current value of the lower limit map used in the second embodiment.

The second embodiment is substantially the same as the first embodiment except that an internally opening type EGR valve 226 shown in FIG. 7 is used instead of the EGR valve 26 shown in FIG. 2, and a map shown in FIG. 8 is used as the current value of the lower limit map used in step S110. In FIG. 7, elements similar to those in the first embodiment are designated by the same reference numerals.

Here, the EGR valve 226 and a driving mechanism thereof will be explained referring to FIG. 7. The EGR valve 226 is provided with a diaphragm mechanism. The inside of a body case 226a of the EGR valve 226 is separated by a diaphragm 226b into a first diaphragm chamber 226c and a second diaphragm chamber 226d. The first diaphragm chamber 226c is connected to a vacuum pump 27 driven by the diesel engine 4 and atmosphere via an EVRV 74. The second diaphragm chamber 226d is opened into the exhaust gas recirculation pipe 24.

A rod 226e is attached to one surface of the diaphragm 226b at the side of the second diaphragm chamber 226d, projecting toward a seat portion 226g disposed within the exhaust gas recirculation pipe 24. The rod 226e is provided at its tip end with a valve 226f for adjusting an exhaust gas flow in cooperation with the seat portion 226g.

The EVRV 74 generates a vacuum pressure adjusted in accordance with the current for driving the ECU 51 from a vacuum pressure supplied from the vacuum pump 27 and atmospheric pressure supplied from atmospheric side, and supplies the vacuum pressure to the first diaphragm chamber 226c of the EGR valve 226 as a control pressure. Therefore, a position of the diaphragm 226b is determined by a control pressure at the side of the first diaphragm chamber 226c and a back pressure (exhaust gas pressure in the exhaust gas recirculation pipe 224) at the side of the second diaphragm chamber 226d. The position of the diaphragm 226b determines a position of the rod 226e attached to the one surface of the diaphragm 226b, and also determines a relative positional relation (corresponding to the opening degree of the EGR valve 226) between the valve 226f and the seat portion 226g. From the above, it can be found that the opening degree of the EGR valve 226 is determined by a balance of the control pressure from the EVRV 74 and the exhaust gas pressure in the exhaust gas recirculation pipe 24.

The EGR valve 226 has a characteristic opposite to the EGR valve 26 of the first embodiment, and as the engine revolution speed NE is increased as shown in FIG. 8, the current value of the lower limit EIEOF is reduced. Therefore, a current value of the lower limit map in which the current value of the lower limit EIEOF is reduced as the engine revolution speed NE increases as shown in FIG. 8 is used in step S110.

According to the second embodiment as aforementioned, the same effects as those in the first embodiment can be obtained.

Other Embodiments

Although the engine revolution speed NE is used as the parameter in the current value of the lower limit maps (FIGS. 6 and 8) of the respective embodiments, an exhaust gas pressure sensor may be provided such that an exhaust gas pressure is directly detected as a back pressure, and the current value of the lower limit map using the parameter of this exhaust gas pressure may be used. In this case, in the structure of the EGR valve 26 of the first embodiment, as the exhaust gas pressure is reduced, the current value of the lower limit EIEOF is also reduced as shown in FIG. 6, and in the structure of the EGR valve 226 in the second embodiment, as the exhaust gas pressure is increased, the current value of the lower limit EIEOF is reduced as shown in FIG. 8.

Further, as the lower current value map, instead of using the engine revolution speed NE or the exhaust gas pressure as a parameter, the current value of the lower limit EIEOF may be calculated from a current value of the lower limit map using, as a parameter, an intake pressure detected by the intake pressure sensor 62 indirectly indicating the degree of the exhaust gas pressure, an intake air amount obtained by providing the air-flow meter, or a fuel injection amount. In this case, in the structure of the EGR valve 26 of the first embodiment, as the exhaust gas pressure is reduced, the current value of the lower limit EIEOF is also reduced as shown in FIG. 6, and in the structure of the EGR valve 226 in the second embodiment, as the exhaust gas pressure is increased, the current value of the lower limit EIEOF is reduced as shown in FIG. 8.

In the EVRV 74, the vacuum pressure generated by the vacuum pump driven by the diesel engine 4 is adjusted by atmospheric pressure and the adjusted vacuum pressure is supplied to the EGR valve 26 or 226 in the above embodiments. Alternatively, vacuum pressure in the intake pipe 10 downstream from the first throttle valve 34 and the second throttle valve 40 may be adjusted by atmospheric pressure and supplied to the EGR valve 26 or 226.

The aforementioned embodiments describes the EGR valve 26 or 226 as the object to be controlled. However, the present invention can be applied to a valve of such type with the opening degree adjusted by a relation with a back pressure varied with the driving state of the diesel engine 4 if the opening degree of the valve is adjusted in a state where the vacuum pressure generated by the vacuum pump or the intake pipe is supplied. For example, the present invention can be applied to an intake throttle valve such as the second throttle valve 40 or the like, an exhaust throttle valve used for an exhaust gas brake, a variable turbo apparatus (VNT) and the like.

Although each of the embodiments represents an example in which the present invention is applied to a diesel engine, it can be applied to a gasoline engine.

Although the current value of the lower limit EIEOF is calculated from the unidimensional map of the engine revolution speed NE in each of the embodiments, the current value of the lower limit EIEOF may be calculated from a two-dimensional map of the engine revolution speed NE and the fuel injection amount.

The limit value of the command signal of the current value (current value of the lower limit EIEOF) in each of the embodiments, a lower limit duty value may be used in place of the current value of the lower limit EIEOF if the current amount is controlled by the duty control, and if a feedback control is conducted by detecting a lift amount of the EGR valve 26 or 226, a lower limit lift amount may be used.

Although the foregoing embodiments employ the EGR diaphragm-type EGR valve 26 or 226, whose opening degree is determined by a balance of the control pressure and the back pressure, a different type EGR valve whose opening degree is determined by a balance of the back pressure and the drive force acting in such a direction as to oppose the back pressure may be employed. As for a source that generates the drive force, it is possible to use a linear solenoid, a step motor and the like having well-known constructions.

Embodiments of the present invention have been described above. A function for realizing the embodiments of the present invention can be provided as a program which runs on the computer system. In the foregoing, the program can be stored in a recording medium such as ROM or backup RAM that can be read by the computer, which can be incorporated to be used in the computer system. Alternatively, the program may be stored in a recording medium such as a floppy disk, a magneto-optical disk, a CD-ROM and a hard disk that can be read by the computer, which may be loaded into the computer system for actuation in case of necessity.

What is claimed is:

1. An actuator control apparatus for an internal combustion engine, comprising:

an actuator operated by a balance of a control pressure and a back pressure that varies with a driving state of the internal combustion engine;

a control pressure supply valve for supplying the control pressure to the actuator in accordance with a command signal; and limit value setting means for setting a limit value of the command signal in accordance with a driving state of the internal combustion engine, wherein, as one of the back pressure and an engine revolution speed is reduced, the limit value setting means sets the limit value of the command signal so that an opening degree of the actuator is decreased.

2. An actuator control apparatus for an internal combustion engine according to claim 1, wherein the limit value setting means sets a limit value of the command signal in accordance with the back pressure.

3. An actuator control apparatus for an internal combustion engine according to claim 1, wherein the limit value setting means sets a limit value of the command signal in accordance with a revolution speed of the internal combustion engine.

4. An actuator control apparatus for an internal combustion engine according to claim 1, wherein the actuator is formed as an EGR valve for controlling an opening degree of an exhaust gas recirculation passage, the control pressure supply valve is formed as an electric pressure regulating valve for controlling a pressure to be supplied to the EGR valve, and the command signal having a limit value is formed as a current for driving the electric pressure regulating valve and the limit value is a lower limit of the driving current.

5. An actuator control apparatus for an internal combustion engine according to claim 4, wherein the limit value setting means uses a revolution speed of the internal combustion engine as a driving state thereof, and sets a current value of the lower limit in accordance with the revolution speed of the internal combustion engine.

6. An actuator control apparatus for an internal combustion engine according to claim 5, further comprising:

a revolution sensor for detecting a revolution speed of the internal combustion engine to be output as a signal indicating a driving state of the internal combustion engine;

wherein the limit value setting means sets the current value of the lower limit in accordance with a signal output from the revolution sensor.

7. An actuator control apparatus for an internal combustion engine according to claim 4, wherein the limit value setting means sets a current value of the lower limit in accordance with the back pressure.

8. An actuator control apparatus for an internal combustion engine according to claim 7, further comprising:

an exhaust pressure sensor for detecting an exhaust pressure of the internal combustion engine to be output as a signal indicating a driving state of the internal combustion engine; and wherein the limit value setting means sets the current value of the lower limit in accordance with the signal output from the exhaust pressure sensor.

9. An actuator control apparatus for an internal combustion engine according to claim 4, further comprising:

an intake pressure sensor for detecting an intake pressure of the internal combustion engine to be output as a signal indicating a driving state thereof; wherein the limit value setting means sets the current value of the lower limit in accordance with a signal output from the intake pressure sensor.

10. An actuator control apparatus for an internal combustion engine according to claim 4, further comprising:

air-flow meter for detecting an amount of intake air supplied to the engine, the air-flow meter outputting a signal indicating a driving state of the engine;

wherein the limit value setting means sets the current value of the lower limit in accordance with the signal output from the air-flow meter.

11. An actuator control apparatus for an internal combustion engine according to claim 4, further comprising:

fuel injection detecting means for detecting an amount of fuel injected to the engine and for outputting a signal corresponding to the fuel injection amount as a value indicating a driving state of the engine;

wherein the limit setting means sets the current value of the lower limit in accordance with the signal output from the fuel injection detecting means.

12. An actuator control apparatus for an internal combustion engine according to claim 4, wherein the control pressure supply valve is formed as an electric vacuum pressure regulating valve for controlling a vacuum pressure from to be supplied to the EGR valve, and the command signal having a limit value is formed as a current for driving the electric vacuum pressure regulating valve and the limit value is a lower limit of the current value.

13. An actuator control apparatus for an internal combustion engine, comprising:

an actuator for generating a drive force in such a manner that the drive force acts against a back pressure that varies with a driving state of the internal combustion engine;

actuator control means for supplying the actuator with a command signal for controlling an amount of the drive force generated; and limit value setting means for setting a limit value of the command signal in accordance with a driving state of the internal combustion engine, wherein, as one of the back pressure and an engine revolution speed is reduced, the limit value setting means sets the limit value of the command signal so that an opening degree of the actuator is decreased.

14. An actuator control apparatus for an internal combustion engine according to claim 13, wherein the actuator has a linear solenoid as a source for generating the drive power.

15. An actuator control apparatus for an internal combustion engine according to claim 14, wherein the actuator has a step motor as a source for generating the drive power.

* * * * *